Oct. 27, 1959 M. J. PURETIC Re. 24,727

OSCILLATING SYSTEM FOR DERRICK BOOMS

Original Filed July 2, 1957 2 Sheets-Sheet 1

INVENTOR

MARIO J. PURETIC

BY William C. Babcock.

ATTORNEY

Oct. 27, 1959 M. J. PURETIC Re. 24,727

OSCILLATING SYSTEM FOR DERRICK BOOMS

Original Filed July 2, 1957 2 Sheets-Sheet 2

INVENTOR
MARIO J. PURETIC

BY William C. Babcock.
ATTORNEY

United States Patent Office

Re. 24,727
Reissued Oct. 27, 1959

24,727

OSCILLATING SYSTEM FOR DERRICK BOOMS

Mario J. Puretic, San Pedro, Calif.

Original No. 2,859,882, dated November 11, 1958, Serial No. 669,620, July 2, 1957. Application for reissue June 29, 1959, Serial No. 823,793

12 Claims. (Cl. 212—66)

Figure 1:
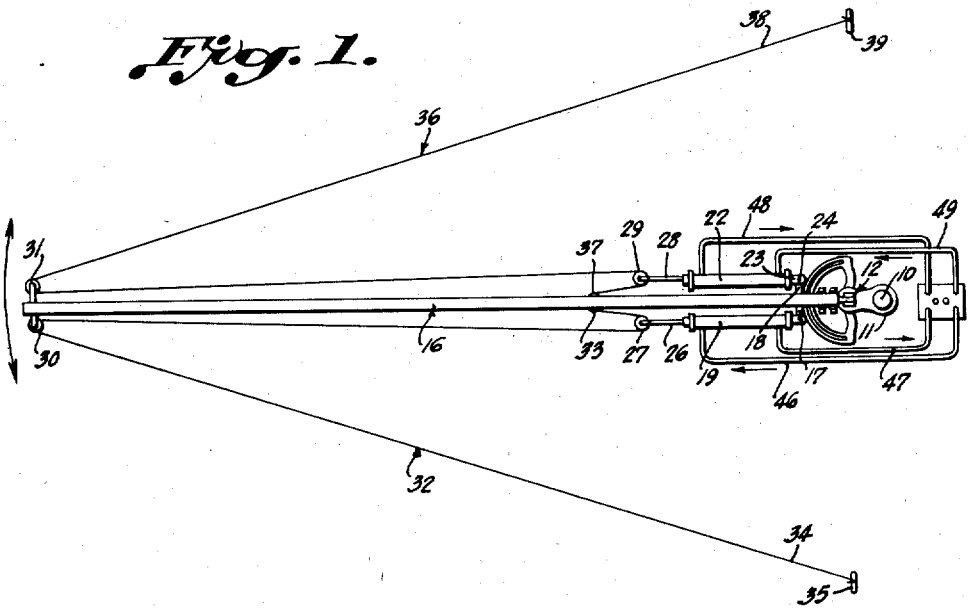

Matter enclosed in heavy brackets [ ] appears in the original patent but forms no part of this reissue specification; matter printed in italics indicates the additions made by reissue.

This invention relates to hoisting apparatus primarily for use on shipboard and more particularly to a mechanism for automatically providing an oscillating movement to the boom of such hoisting apparatus in order to move the same back and forth through a predetermined arc, such swinging movement being continuous and automatic.

While the apparatus of this invention may be utilized in any installation where it is desired to continuously and automatically oscillate the boom of a derrick through a predetermined arc, the primary purpose of this invention is to provide an apparatus for use in facilitating fishing operations in which a relatively long net, commonly called a seine, must be hoisted from the water and stacked on the deck of the fishing vessel. Heretofore, it has been customary to hoist the seine from the water and to manually lay the same in folds on the deck of the vessel as the seine is lowered by the derrick, but since such seines are relatively heavy, considerable manual exertion is required on the part of several men and consequently, any apparatus which will perform this operation automatically thereby eliminating the necessity of manual operations will materially reduce the cost of such fishing operation.

It is accordingly an object of the invention to provide an automatic oscillating system for derrick booms which may be conveniently applied to existing equipment without material modification thereof or which may be conveniently and economically included during the manufacture of such equipment.

A further object of the invention is the provision of an automatic oscillating system for derrick booms in which the arc through which the boom oscillates may be conveniently adjusted and with the center of such oscillation disposed at any desired angular position.

A still further object of the invention is the provision of an automatic oscillating system for derrick booms in which fluid pressure may be utilized to swing a boom to and fro through a predetermined arc and over any desired portion of the deck of a vessel or the surface below the boom.

Another object of the invention is the provision of an automatic oscillating system for derrick booms in which fluid pressure may be utilized to swing a boom to and fro through a predetermined arc and over any desired portion of the deck of a vessel or the surface below the boom.

Another object of the invention is the provision of an automatic oscillating system for derrick booms in which double acting fluid pressure operated cylinders are utilized to swing the boom to and fro and in which the operation of such cylinders are automatically controlled by a simple reversing valve mechanism.

A further object of the invention is the provision of an automatic oscillating system for derrick booms which may be conveniently and economically manufactured from readily available materials and which will materially reduce the cost of fishing operations.

A still further object of the invention is to provide means which may be manually operated to swing a boom in the manner described herein.

Figure 4:
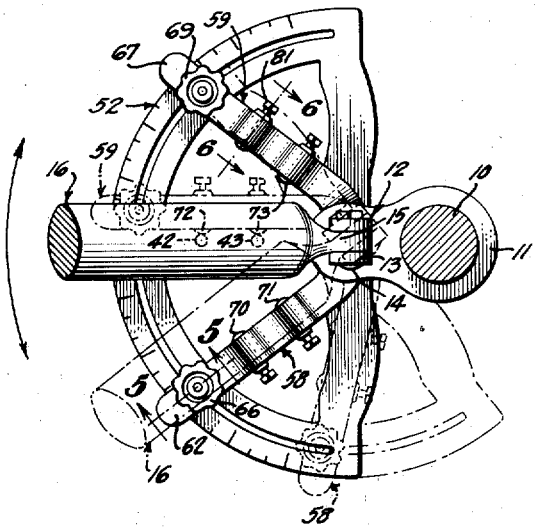
Figure 5:
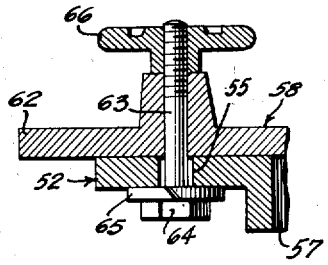
Figure 6:
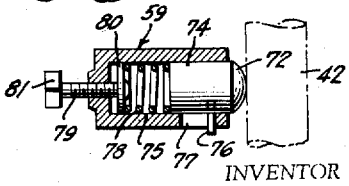
Figures 2, 3:
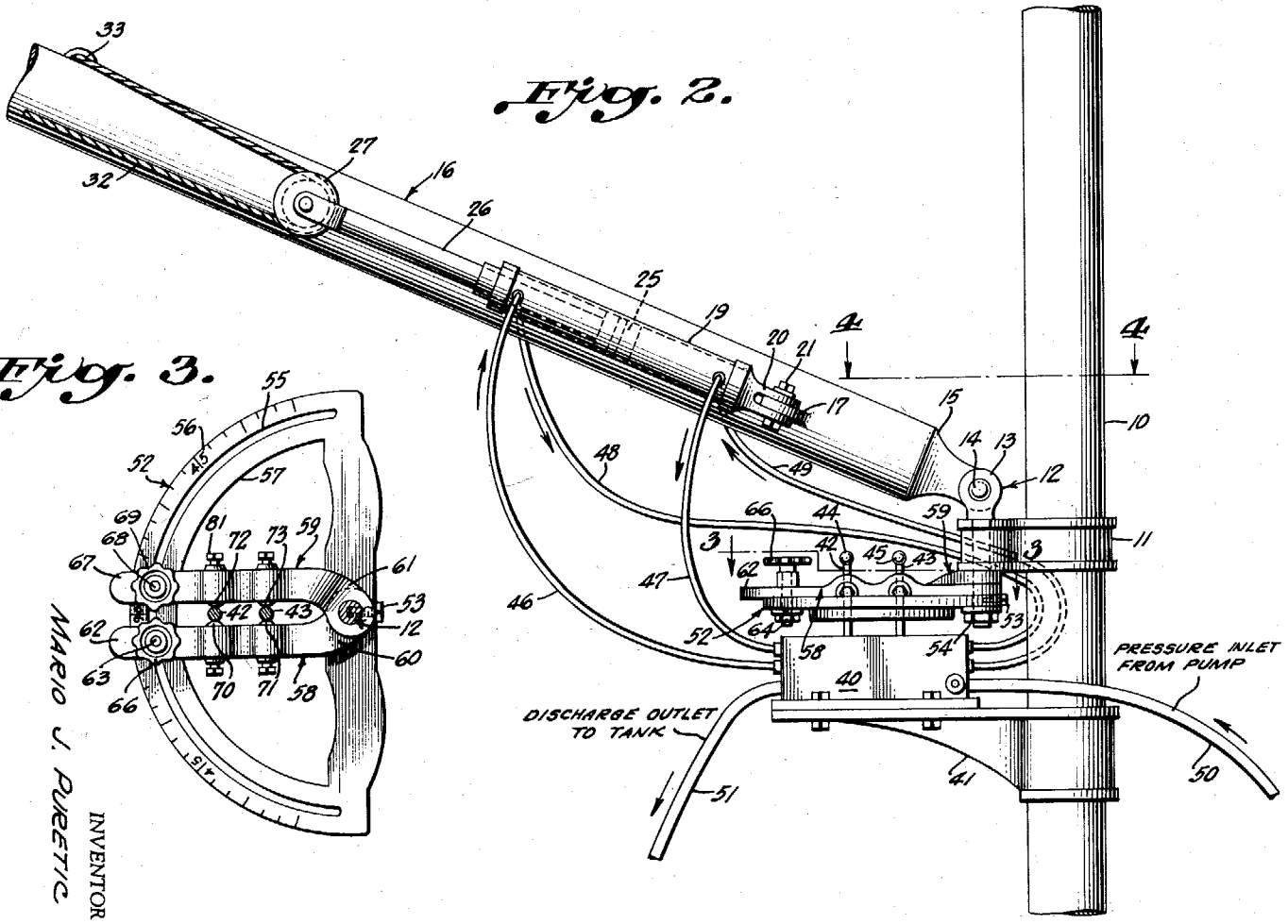

Further objects and advantages of the invention will be apparent from the following description taken in conjunction with the accompanying drawings, wherein:

Fig. 1 is a top plan view showing a derrick incorporating the oscillating system of this invention and further showing the arrangement of the cables utilized to swing the derrick boom from one side to the other;

Fig. 2 a side elevational view showing a portion of a derrick mast and boom, together with the oscillating system of this invention and the manner in which the same is installed;

Fig. 3 a sectional view taken substantially on the line 3—3 of Fig. 2 and showing the valve actuating lever shifting members disposed in position to maintain the boom substantially in a fore and aft position;

Fig. 4 a sectional view taken substantially on the line 4—4 of Fig. 2 and showing the valve actuating lever shifting members disposed in position to cause oscillation of the derrick boom through a predetermined arc and showing in dotted lines the extreme position of the boom and shifting members prior to reversal of the oscillating mechanism;

Fig. 5 a fragmentary sectional view taken substantially on the line 5—5 of Fig. 4 and showing the mechanism utilized to lock the shifting members in adjusted position; and Fig. 6 a fragmentary sectional view taken substantially on the line 6—6 of Fig. 4 and showing the yieldable actuating lever engaging means on the shifting members.

With continued reference to the drawing, there is shown a derrick mast 10 upon which may be mounted at any desired location a collar 11 which serves to pivotally support a king pin 12 for movement about a vertical axis. King pin 12 may be provided at the upper end thereof with spaced ears 13 and a pivot pin 14 extending through the ears 13 serves to pivotally mount the lower end 15 of a boom 16 for movement about a horizontal axis.

The boom 16 may be provided with lugs 17 and 18 extending from opposite sides thereof adjacent the lower end 15 and fluid pressure operated cylinder 19 may be provided at the lower end with spaced ears 20 which are received over the lug 17 and a fastening member 21 extending through the ears 20 and lug 17 serves to secure the cylinder 19 at the lower end to the boom 16. In a similar manner, a second fluid pressure operated cylinder 22 may be provided with spaced ears 23 which are received over the lug 18 and pivotally secured thereto by suitable fastening means 24 in order to secure the cylinder 22 to the boom 16 adjacent the lower end thereof.

Cylinder 19 may be provided with a double acting piston 25 to which is connected a ram 26 projecting from the upper end of the cylinder 19 and at the upper end of the ram 26 there is mounted a pulley 27. In a similar manner, the cylinder 22 may be provided with a double acting piston to which is attached a ram 28 extending from the upper end of the cylinder 22 and at the upper end of the ram 28 there is mounted a pulley 29.

As best shown in Fig. 1, the boom 16 may be provided at the upper or head end thereof with head pulleys 30 and 31 disposed on opposite sides of the boom 16 and a flexible cable 32 of suitable material is trained over the head pulley 30 and downwardly around the pulley 27 on the ram 26 with the adjacent end 33 of the cable 32 being attached to the boom 16 outwardly of the outermost point of travel of the ram 26. The opposite end 34 of the cable 32 is secured to a fixed member 35, which in the case of a marine installation, may be a part of the boat on which the apparatus is installed. In a similar manner, a flexible cable 36 is trained over the head pulley 31 and downwardly around pulley 29 on the ram 28 with the adjacent end 37 of the cable 36 being attached to the boom 16 at a point outwardly of the outermost point of travel of the ram 28. The opposite end 38 of the cable 36 is attached to a fixed member 39 which as clearly shown in Fig. 1 is in alignment with the king pin 12 and the fixed member 35 to which the cable 32 is attached.

A reversing control valve 40 of any suitable design may be conveniently mounted on a bracket 41 secured to the mast 10 below the collar 11 and the control valve 40 may be provided with upwardly extending spaced valve actuating levers 42 and 43. Actuating lever 42 may be provided with a hand engaging knob 44 and actuating lever 43 may be provided with a hand engaging knob 45. Fluid pressure operated cylinder 19 may be connected to the control valve 40 through suitable flexible conduits 46 and 47 and the operation of cylinder 19 may be controlled by the actuating member 42. In a similar manner, fluid pressure operated cylinder 22 may be connected to the control valve 40 through suitable flexible conduits 48 and 49 and cylinder 22 may be controlled by the valve actuating lever 43. A fluid pressure supply conduit 50 may be connected to any suitable fluid pressure source, such as a pump and to the valve 40 and a fluid pressure discharge conduit 51 may also be connected to the control valve 40 and to a fluid pressure supply tank or sump to which the fluid pressure pump may be connected.

Since the fluid pressure operated cylinders 19 and 22 are double acting, it will be seen that upon actuation of the valve actuating levers 42 and 43 in either direction that fluid pressure will be introduced to the cylinders 19 and 22 to either project the rams 26 and 28 therefrom or to retract such rams within the cylinders. As will be seen from an inspection of Fig. 1, retraction of the ram 26 and projection of the ram 28 will serve to shorten the cable 32 and, at the same time, lengthen the cable 36 thereby swinging the boom 16 toward the fixed member 35 and operation of the rams 26 and 28 in the opposite directions will serve to swing the boom 16 in the opposite direction toward the fixed member 39. The length of the arc through which the boom 16 moves will, of course, be controlled by the length of travel of the rams 26 and 28 in the cylinders 19 and 22.

In order to provide automatic operating on the actuating levers 42 and 43 to provide continuous automatic oscillation of the boom 16, a substantially semi-circular plate 52 may be fixed to the king pin 12 by means of a set screw 53 or other suitable fastening means for movement with the king pin 12 during swinging movement of the boom 16. The plate 52 may also be retained on the lower end of the king pin 12 by means of a nut or other suitable fastening means 54. Adjacent the periphery of the semi-circular plate 52 there may be provided an arcuate slot 55 and a suitable degree scale 56 may be provided on the plate 52 adjacent the slot 55. A substantially semi-circular opening 57 is provided in the plate 52 and the actuating levers 42 and 43 of the reversing valve 40 project upwardly through the opening 57 to permit free oscillating movement of the plate 52.

Opposed actuating lever shifting members 58 and 59 are disposed on opposite sides of the actuating levers 42 and 43 and the inner ends 60 and 61 of the shifting members 58 and 59 respectively are mounted for free pivotal movement on the king pin 12 above the semi-circular plate 52. Shifting member 58 is provided adjacent the outer end 62 thereof with clamp means comprising a bolt 63 extending downwardly through the slot 55 in the plate 52, there being provided at the lower end of the bolt 63 a head 64 and a washer 65 engaging the lower surface of the plate 52. A finger engaging knob 66 is threadedly received on the upper end of the bolt 63 and serves to clamp the shifting member 58 in adjusted angular position with relation to the semi-circular plate 52. In a similar manner, the shifting member 59 is provided adjacent the outer end 67 thereof with a bolt 68 extending through the slot 55 in the plate 52 and a finger engaging knob 69 threadedly engaging the upper end of the bolt 68 serves to clamp the shifting member 59 in adjusted angular position with relation to the semi-circular plate 52.

Shifting member 58 may be provided with actuating lever engaging means 70 and 71, while shifting member 59 may be provided with actuating lever engaging means 72 and 73. Each of the actuating lever engaging means may be similarly constructed and as best shown in Fig. 6, such means may comprise a plunger 74 slidably received in a bore 75 in the shifting members 58 and 59 and sliding movement of the plunger 74 may be restricted by a pin 76 disposed in a slot 77. Other means for restricting movement of the plunger 74 may, of course, be employed if desired. The plunger 74 may be yieldably urged to outer position by a compression spring 78 disposed in the bore 75 and engaging the plunger 74 and the tension of spring 78 may be conveniently controlled by a screw threaded member 79 threadedly received in the shifting members 58 and 59 and provided with a washer or other suitable means 80 engaging the compression spring 78. The screw threaded member 79 may be provided with a wrench receiving portion 81 to permit convenient adjustment thereof.

In the operation of the apparatus of this invention, the shifting members 58 and 59 may be set at any desired angular position, as shown in full lines in Fig. 4, and it may be assumed that the valve actuating levers 42 and 43 are in neutral position and the boom 16 in a fore and aft position. It is also to be assumed that fluid pressure is supplied in the valve 40 through the conduit 50 and when it is desired to place the apparatus in operation, the hand engaging knobs 44 and 45 on the actuating levers 42 and 43 may be moved in one direction to introduce fluid pressure to the cylinders 19 and 22 thereby resulting in swinging movement of the boom 16 in one direction. Assuming that the actuating levers 42 and 43 are moved toward the shifting member 59 as viewed in Fig. 4, this will result in movement of the boom 16 in a counter-clockwise direction until the actuating levers 42 and 43 are engaged by the means 72 and 73 on the shifting member 59 which will result in moving the actuating levers 42 and 43 to a position to reverse the operation of the cylinders 19 and 22 thereby swinging the boom 16 in the opposite direction. The position at which movement of the actuating levers 42 and 43 takes place to reverse the swinging movement of the boom 16 is shown in dotted lines in Fig. 4. Upon completion of the movement of the boom 16 in the opposite or clockwise direction as shown in Fig. 4, the actuating lever engaging means 70 and 71 on the shifting member 58 will engage the actuating levers 42 and 43 to move such levers to a position to again reverse the operation of the cylinders 19 and 22 thereby swinging the boom 16 in the opposite direction. This oscillating movement of the boom 16 will automatically continue until such time as the actuating levers 42 and 43 are manually moved to neutral position.

It will therefore be seen that a seine suspended from the head or upper end of the boom 16 and being continuously hoisted from the water and lowered toward the deck of the vessel will be laid in folds on the deck of the vessel and set in a uniform manner.

When it is desired to secure the boom 16 in a fore and aft position upon completion of fishing operations or for any other purpose, the shifting members 58 and 59 may be disposed in the position shown in Fig. 3 in which, the actuating levers 42 and 43 are simultaneously engaged by the means 70 and 71, as well as the means 72 and 73 on both of the shifting members 58 and 59. This, of course, will operate to maintain the levers 42 and 43 in neutral position.

Shifting members 58 and 59 adjusted as shown in Fig. 4, the swinging movement of the boom 16 will be uniform about a fore and aft line, but, of course, if desired, the shifting members 58 and 59 may be adjusted to provide a swinging movement centered about a line at an angle to the fore and aft line of the vessel.

It will, therefore, be seen that the apparatus of this invention will operate to efficiently stack a seine on the deck of a vessel in folds of any desired length and will thereby eliminate the necessity of manual handling of the net during recovery thereof from the water thereby materially reducing the cost of fishing operations.

While the apparatus of this invention has been described primarily for use on a fishing vessel, nevertheless, it will be obvious that the same may be utilized for any installation where a continuous automatic or manual oscillation of the boom of a derrick is required or advantageous and the apparatus of this invention is of such nature, that the same may be conveniently installed on any existing derrick installation or, of course, may be incorporated in new installations.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. An automatic oscillating system for derrick booms, said system comprising a king pin mounted for pivotal movement about a vertical axis, a boom pivotally connected at the lower end to said king pin for movement about a horizontal axis, a pair of double acting fluid pressure cylinders mounted on opposite sides of said boom adjacent the lower end, a ram projecting from the upper end of each cylinder, a pulley on the upper end of each ram, a pair of head pulleys secured to the upper end of said boom on opposite sides, a pair of cables trained over said head pulleys and around the pulleys on said ram with the adjacent ends of said cables fixed to said boom outwardly of the outermost point of travel of said rams, the opposite ends of said cables being fixed at transversely spaced points in alignment with said king pin, a reversing control valve for each cylinder, conduits connecting said cylinders and said valves, a fluid pressure supply conduit and a fluid pressure discharge conduit connected to said valves, an actuating lever on each valve, a substantially semi-circular plate fixed to said king pin for movement therewith, an arcuate slot in said plate adjacent the periphery, a substantially semi-circular opening in said plate through which said actuating levers project, opposed actuating lever shifting members disposed on opposite sides of said actuating levers, said members being mounted at one end for free pivotal movement on said king pin, clamp means at the opposite end of each member extending through said slot for fixing each member in adjusted angular position and yieldable actuating lever engaging means on each member whereby said levers and control valves will be periodically actuated to alternately connect said fluid pressure supply conduit to said cylinders to lengthen and shorten said cables thereby continuously and automatically swinging said boom back and forth through an arc determined by the position of said members on said plate.

2. An automatic oscillating system for derrick booms, said system comprising a king pin mounted for pivotal movement about a vertical axis, a boom pivotally connected at the lower end to said king pin for movement about a horizontal axis, a pair of double acting fluid pressure cylinders mounted on opposite sides of said boom adjacent the lower end, a ram projecting from the upper end of each cylinder, a pulley on the upper end of each ram, a pair of head pulleys secured to the upper end of said boom on opposite sides, a pair of cables trained over said head pulleys and around the pulleys on said rams with the adjacent ends of said cables fixed to said boom outwardly of the outermost point of travel of said rams, the opposite ends of said cables being fixed at transversely spaced points in alignment with said king pin, a reversing control valve for each cylinder, conduits connecting said cylinders and said valves, a fluid pressure supply conduit and a fluid pressure discharge conduit connected to said valves, an actuating lever on each valve, a substantially semi-circular plate fixed to said king pin for movement therewith, an arcuate slot in said plate, a substantially semi-circular opening in said plate through which said actuating levers project, opposed actuating lever shifting members disposed on opposite sides of said actuating levers, said members being mounted at one end for free pivotal movement on said king pin, clamp means at the opposite end of each member extending through said slot for fixing each member in adjusted angular position and actuating lever engaging means on each member whereby said levers and control valves will be periodically actuated to alternately connect said fluid pressure supply conduit to said cylinders to lengthen and shorten said cables thereby continuously and automatically swinging said boom back and forth through an arc determined by the position of said members on said plate.

3. An automatic oscillating system for derrick booms, said system comprising a king pin mounted for pivotal movement about a vertical axis, a boom connected at the lower end to said king pin, a pair of double acting fluid pressure cylinders mounted on opposite sides of said boom adjacent the lower end, a ram projecting from the upper end of each cylinder, a pulley on the upper end of each ram, a pair of head pulleys secured to the upper end of said boom on opposite sides, a pair of cables trained over said head pulleys and around the pulleys on said rams with the adjacent ends of said cables fixed to said boom outwardly of the outermost point of travel of said rams, the opposite ends of said cables being fixed at transversely spaced points in alignment with said king pin, a reversing control valve for each cylinder, conduits connecting said cylinders and said valves, a fluid pressure supply conduit and a fluid pressure discharge conduit connected to said valves, an actuating lever on each valve, a substantially semi-circular plate fixed to said king pin for movement therewith, an arcuate slot in said plate, a substantially semi-circular opening in said plate through which said actuating levers project, opposed actuating lever shifting members disposed on opposite sides of said actuating levers, said members being mounted at one end for free pivotal movement on said king pin, clamp means at the opposite end of each member extending through said slot for fixing each member in adjusted angular position and actuating lever engaging means on each member whereby said levers and control valves will be periodically actuated to alternately connect said fluid pressure supply conduit to said cylinders to lengthen and shorten said cables thereby continuously and automatically swinging said boom back and forth through an arc determined by the position of said members on said plate.

4. An automatic oscillating system for derrick booms, said system comprising a king pin mounted for pivotal movement about a vertical axis, a boom connected at the lower end to said king pin, a pair of double acting fluid pressure cylinders mounted on opposite sides of said boom adjacent the lower end, a ram projecting from the upper end of each cylinder, a pulley on the upper end of each ram, a pair of head pulleys secured to the upper end of said boom on opposite sides, a pair of cables trained over said head pulleys and around the pulleys on said rams with the adjacent ends of said cables fixed to said boom outwardly of the outermost point of travel of said rams, the opposite ends of said cables being fixed at transversely spaced points, a reversing control valve for each cylinder, conduits connecting said cylinders and said valves, a fluid pressure supply conduit and a fluid pressure discharge conduit connected to said valves, an actuating lever on each valve, a substantially semi-circular plate fixed to said king pin for movement therewith, an arcuate slot in said plate, a substantially semi-circular opening in said plate through which said actuating levers project, opposed actuating lever shifting members disposed on opposite sides of said actuating levers, said members being mounted at one end for free pivotal movement on said king pin, clamp means at the opposite ends of each member extending through said slot for fixing each member in adjusted angular position and actuating lever engaging means on each member whereby said levers and control valves will be periodically actuated to alternately connect said fluid pressure supply conduit to said cylinders to lengthen and shorten said cables thereby continuously and automatically swinging said boom back and forth through an arc determined by the position of said members on said plate.

5. An automatic oscillating system for derrick booms, said system comprising a king pin mounted for pivotal movement about a vertical axis, a boom connected at the lower end to said king pin, a pair of double acting fluid pressure cylinders mounted on opposite sides of said boom adjacent the lower end, a ram projecting from the upper end of each cylinder, a pulley on the upper end of each ram, a pair of head pulleys secured to the upper end of said boom on opposite sides, a pair of cables trained over said head pulleys and around the pulleys on said rams with the adjacent ends of said cables fixed to said boom outwardly of the outermost point of travel of said rams, the opposite ends of said cables being fixed at transversely spaced points, a reversing control valve for each cylinder, conduits connecting said cylinders and said valves, a fluid pressure supply conduit and a fluid pressure discharge conduit connected to said valves, an actuating lever on each valve, a plate fixed to said king pin for movement therewith, an arcuate slot in said plate, a subtsantially semi-circular opening in said plate through which said actuating levers project, opposed actuating lever shifting members disposed on opposite sides of said actuating levers, said members being mounted at one end for free pivotal movement of said king pin, clamp means at the opposite end of each member extending through said slot for fixing each member in adjusted angular position and actuating lever engaging means on each member whereby said levers and control valves will be periodically actuated to alternately connect said fluid pressure supply conduit to said cylinders to lengthen and shorten said cables thereby continuously and automatically swinging said boom back and forth through an arc determined by the position of said members on said plate.

6. An automatic oscillating system for derrick booms, said system comprising a king pin mounted for pivotal movement about a vertical axis, a boom connected at the lower end to said king pin, a pair of double acting fluid pressure cylinders mounted on opposite sides of said boom adjacent the lower end, a ram projecting from the upper end of each cylinder, a pulley on the upper end of each ram, a pair of head pulleys secured to said boom on opposite sides, a pair of cables trained over said head pulleys and around the pulleys on said rams with the adjacent ends of said cables fixed to said boom outwardly of the outermost point of travel of said rams, the opposite ends of said cables being fixed at transversely spaced points, a reversing control valve for each cylinder, conduits connecting said cylinders and said valves, a fluid pressure supply conduit and a fluid pressure discharge conduit connected to said valves, an actuating lever on each valve, a plate fixed to said king pin for movement therewith, an arcuate slot in said plate, a substantially semi-circular opening in said plate through which said actuating levers project, opposed actuating levers shifting members disposed on opposite sides of said actuating levers, said members being mounted at one end for free pivotal movement on said king pin, clamp means at the opposite end of each member extending through said slot for fixing each member in adjusted angular position and actuating lever engaging means on each member whereby said levers and control valves will be periodically actuated to alternately connect said fluid pressure supply conduit to said cylinders to lengthen and shorten said cables thereby continuously and automatically swinging said boom back and forth through an arc determined by the position of said members on said plate.

7. An automatic oscillating system for derrick booms, said system comprising a king pin mounted for pivotal movement about a vertical axis, a boom connected at the lower end to said king pin, a pair of double acting fluid pressure cylinders mounted on opposite sides of said boom adjacent the lower end, a ram projecting from the upper end of each cylinder, a pulley on the upper end of each ram, a pair of head pulleys secured to said boom on opposite sides, a pair of cables trained over said head pulleys and around the pulleys on said rams with the adjacent ends of said cables fixed to said boom, the opposite ends of said cables being fixed at transversely spaced points, a reversing control valve for each cylinder, conduits connecting said cylinders and said valves, a fluid pressure supply conduit and a fluid pressure discharge conduit connected to said valves, an actuating lever on each valve, a plate fixed to said king pin for movement therewith, an arcuate slot in said plate, a substantially semi-circular opening in said plate through which said actuating levers project, opposed actuating lever shifting members disposed on opposite sides of said actuating levers, said members being mounted at one end for free pivotal movement on said king pin, clamp means at the opposite end of each member extending through said slot for fixing each member in adjusted angular position and actuating lever engaging means on each member whereby said levers and control valves will be periodically actuated to ultimately connect said fluid pressure supply conduit to said cylinders to lengthen and shorten said cables thereby continuously and automatically swinging said boom back and forth through an arc determined by the position of said member on said plate.

8. An automatic oscillating system for derrick booms, said system comprising a king pin mounted for pivotal movement about a vertical axis, a boom connected at the lower end to said king pin, a pair of double acting fluid pressure cylinders mounted on opposite sides of said boom adjacent the lower end, a ram projecting from the upper end of each cylinder, a pulley on the upper end of each ram, a pair of head pulleys secured to said boom on opposite sides, a pair of cables trained over said head pulleys and around the pulleys on said rams with the adjacent ends of said cables fixed to said boom, the opposite ends of said cables being fixed at transversely spaced points, a reversing control valve for each cylinder, conduits connecting said cylinders and said valves, a fluid pressure supply conduit and a fluid pressure discharge conduit connected to said valves, an actuating lever on each valve, a plate fixed to said king pin for movement therewith, an arcuate slot in said plate, an opening in said plate through which said actuating levers project, opposed actuating lever shifting members disposed on opposite sides of said actuating levers, said members being mounted at one end for free pivotal movement on said king pin, clamp means on each member extending through said slot for fixing each member in adjusted angular position and actuating lever engaging means on each member whereby said levers and control valves will be periodically actuated to alternately connect said fluid pressure supply conduit to said cylinders to lengthen and shorten said cables thereby continuously and automatically swinging said boom back and forth through an arc determined by the position of said members on said plate.

9. An automatic oscillating system for derrick booms, said system comprising a king pin mounted for pivotal movement about a vertical axis, a boom connected at the lower end to said king pin, a pair of double acting fluid pressure cylinders mounted on said boom adjacent the lower end, a ram projecting from the upper end of each cylinder, a pulley on the upper end of each ram, a pair of head pulleys secured to said boom, a pair of cables trained over said head pulleys and around the pulleys on said rams with the adjacent ends of said cables fixed to said boom, the opposite ends of said cables being fixed at transversely spaced points on opposite sides of said boom, a reversing control valve for each cylinder, conduits connecting said cylinders and said valves, a fluid pressure supply conduit and a fluid pressure discharge conduit connected to said valves, an actuating lever on said valves, a plate fixed to said king pin for movement therewith, an arcuate slot in said plate, an opening in said plate through which said actuating levers project, opposed actuating lever shifting members disposed on opposite sides of said actuating levers, said members being mounted at one end for free pivotal movement on said king pin, clamp means on each member extending through said slot for fixing each member in adjusted angular position and actuating lever engaging means on each member whereby said levers and control valves will be actuated to alternately connect said fluid pressure supply conduit to said cylinders, to lengthen and shorten said cables thereby continuously and automatically swinging said boom back and forth through an arc determined by the position of said members on said plate.

10. An automatic oscillating system for derrick booms, said system comprising a king pin mounted for pivotal movement about a vertical axis, a boom connected at the lower end to said king pin, a pair of double acting fluid pressure cylinders mounted on said boom adjacent the lower end, a ram projecting from the upper end of each cylinder, a pulley on the upper end of each ram, a pair of head pulleys secured to said boom, a pair of cables trained over said head pulleys and around the pulleys on said rams with the adjacent ends of said cables fixed to said boom, the opposite ends of said cables being fixed at transversely spaced points on opposite sides of said boom, a reversing control valve for each cylinder, conduits connecting said cylinders and said valves, a fluid pressure supply conduit and a fluid pressure discharge conduit connected to said valves, an actuating lever on each valve, a plate fixed to said king pin for movement therewith, an arcuate slot in said plate, an opening in said plate through which said actuating levers project, opposed actuating lever shifting members disposed on opposite sides of said actuating levers, said members being mounted at one end for free pivotal movement on said king pin and clamp means on each member extending through said slot for fixing each member in adjusted angular position whereby said levers and control valves will be periodically actuated to alternately connect said fluid pressure supply conduit to said cylinders, to lengthen and shorten said cables thereby continuously and automatically swinging said boom back and forth through an arc determined by the position of said members on said plate.

*11. An oscillating system for derrick booms, said system comprising: a collar adapted to be affixed around a ship's mast, said collar having a cylindrical bore therein to secure the lower cylindrical portion of a king pin mounted for pivotal movement about a vertical axis, the upper end of said king pin begin provided with spaced ears, a boom connected at its lower end to the ears of said king pin by a horizontally extending pin, a pair of fluid pressure cylinders mounted on said boom, a ram projecting from an end of each of said cylinders, a pulley on the end of each ram, a pair of pulleys secured to the outer end of said boom, a pair of cables trained over said last-named pulleys and around said pulleys on said rams with the adjacent ends of said cables fixed to said boom, the opposite ends of said cables being fixed at transversely spaced points on opposite sides of said boom, a bracket adapted to be secured to said mast and a reversing control valve for each cylinder mounted on said bracket, conduits connecting said cylinders and said valves, a fluid pressure supply conduit and a fluid pressure discharge conduit connected to said valves, each of said control valves being provided with an upwardly extending lever operable manually for periodically shifting said control valves to alternately connect said fluid pressure supply conduit to said cylinders to length and shorten said cables thereby swinging said boom back and forth.*

*12. An oscillating system for derrick booms, said system comprising: a collar adapted to be affixed around a ship's mast, said collar having a cylindrical bore therein to receive the lower cylindrical portion of a king pin mounted for pivotal movement about a vertical axis, a boom connected at its lower end to the ears of said king pin by a horizontally extending pin, a pair of fluid pressure cylinders mounted on said boom, a ram projecting from an end of each said cylinders, a pulley on the end of each ram, a pair of pulleys secured to the outer end of said boom, a pair of cables trained over said last-named pulleys and around said pulleys on said rams with the adjacent ends of said cables fixed to said boom at points spaced rearwardly of the pulleys on said rams, a bracket adapted to be secured to said mast and a reversing control valve for each cylinder mounted on said bracket, conduits connecting said cylinders and said valves, a fluid pressure supply conduit and a fluid pressure discharge conduit connected to said valves, each of said control valves being provided with an upwardly extending lever operable manually for periodically shifting said control valves to alternately connect said fluid pressure supply conduit to said cylinders to lengthen and shorten said cables thereby swinging said boom back and forth.*

References Cited in the file of this patent or the original patent

UNITED STATES PATENTS

| | | |
|---|---|---|
| 400,798 | Russell | Apr. 2, 1889 |
| 497,216 | Rogers | May 9, 1893 |
| 665,684 | Hetlesaeter | Jan. 8, 1901 |
| 2,021,066 | Huxford | Nov. 12, 1935 |